(12) United States Patent
Joubert et al.

(10) Patent No.: US 6,384,974 B1
(45) Date of Patent: May 7, 2002

(54) POLARIZATION BEAM SPLITTER

(75) Inventors: Cécile Joubert, Orsay; Jean-Claude Lehureau, Ste Genevieve des Bois, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/720,271

(22) PCT Filed: May 9, 2000

(86) PCT No.: PCT/FR00/01242
§ 371 Date: Jan. 11, 2001
§ 102(e) Date: Jan. 11, 2001

(87) PCT Pub. No.: WO00/68716
PCT Pub. Date: Nov. 16, 2000

(30) Foreign Application Priority Data

May 11, 1999 (FR) .............................. 99 06003

(51) Int. Cl.[7] .................................................. G02B 5/30
(52) U.S. Cl. ...................... 359/498; 359/495; 359/500; 359/583
(58) Field of Search .................. 359/485, 487, 359/488, 495, 498, 500, 583

(56) References Cited

U.S. PATENT DOCUMENTS

| 3,998,524 A | * | 12/1976 | Hubby ...................... 359/496 |
| 4,725,113 A | * | 2/1988 | Chang ......................... 385/11 |
| 5,347,380 A | | 9/1994 | Lehureau |
| 5,410,421 A | | 4/1995 | Huignard et al. |
| 5,526,063 A | | 6/1996 | Joubert et al. |
| 5,546,200 A | | 8/1996 | Nicolas et al. |
| 5,612,820 A | * | 3/1997 | Schrenk et al. ............. 359/498 |
| 5,625,491 A | * | 4/1997 | Von Gunten |
| 5,801,794 A | | 9/1998 | Lehureau et al. |
| 5,940,050 A | | 8/1999 | Joubert et al. |
| 5,946,114 A | | 8/1999 | Loiseaux et al. |
| 5,978,346 A | * | 11/1999 | Mizuno et al. ............. 369/112 |
| 6,014,192 A | | 1/2000 | Lehureau et al. |
| 6,069,728 A | | 5/2000 | Huignard et al. |
| 6,157,471 A | | 12/2000 | Bignolles et al. |

FOREIGN PATENT DOCUMENTS

| EP | EP 0 428 213 | * | 5/1991 |
| EP | EP 0 710 856 | * | 5/1996 |

* cited by examiner

Primary Examiner—Darren Schuberg
(74) Attorney, Agent, or Firm—Oblon, Spivak, McClelland, Maier & Neustadt, P.C.

(57) ABSTRACT

A polarization splitter which includes a splitting medium lying between two transparent elements of defined indices. The splitting medium includes a periodic structure of layers of materials of different indices and having a period which is small compared with the wavelength of an incident beam so as to form a uniaxial birefringent medium of optical axis perpendicular to the plane of the periodic structure. The two transparent elements are made of a material of index approximately equal to the ordinary index ($n_o$) of the periodic structure.

7 Claims, 3 Drawing Sheets

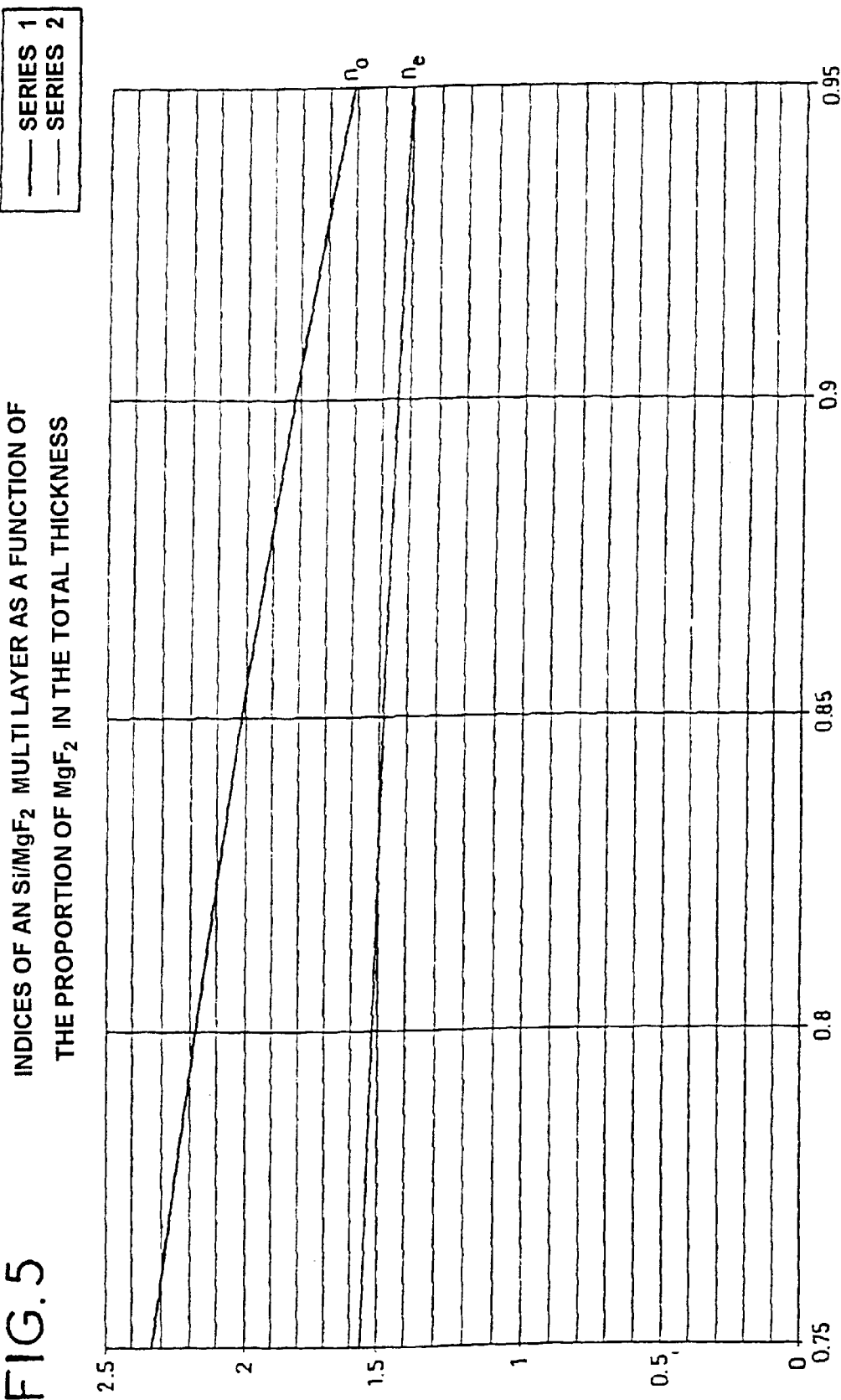

POLARIZATION BEAM SPLITTER

BACKGROUND OF THE INVENTION

1. Field of the Invention

The invention relates to an optical polarization splitter accomplishing the spatial splitting of two orthogonal polarization components with a wide spectral and angular acceptance. This splitter is particularly applicable in liquid-crystal displays. The use of a polarization beam splitters or PBSs makes it possible in fact to improve the luminous efficiency in transmissive liquid-crystal projector architectures or to split the beam coming from the illumination thereof, modulated and having to be projected in reflective liquid-crystal projector architectures.

2. Discussion of the Background

There are two large families of polarization splitters.

A first family uses the combination of an interference filter composed of dielectric layers and the Brewster effect. What is involved is a polarizer of the Neille type described, for example, in the document "High Performance Thin Film Polarizer for the UV and visible spectral regions" by J. A. Dobrowolski and A. Waldorf, Applied Optics, Vol. 20, p. 111, 1981.

This technique is widely used in the polarization splitters currently available on the market. Such a splitter is generally in the form of a cube, the dielectric layers making an angle of 45° with the normal. Their main drawback is the low angular acceptance, of about ±7°, this often being insufficient for display applications. The available spectral band depends on the combination of layers and may cover the entire visible spectrum.

A second family of splitters uses the total reflection of light when the latter crosses a dioptic interface, passing from a medium of index $n_1$ to a medium of index $n_2$ where $n_1 > n_2$. The angle $\theta_R$ above which there is total reflection is obtained from Fresnel's Law:

$$\theta_R = \arcsin\frac{n_2}{n_1}$$

For any angle $\theta > \theta_R$ there will be total reflection.

The principle of such a splitter is shown in FIG. 1 and, for example, in French Patent Application No. 2 685 500. Two high-index prisms 1 and 2 are separated by a birefringent layer 3 composed of polymerized liquid crystal. The optical axis of the layer is coincident with the director of the elongate liquid-crystal molecule. The molecules are aligned in the plane of the liquid-crystal layer. Let $n_e$ be the extraordinary index of the liquid crystal and $n_o$ the ordinary index. For nematic liquid crystals, $n_e > n_o$. Let us assume that the indices of the two prisms are equal to $n_e$. One of the polarizations incident on the prism/liquid-crystal layer interface at an angle $$\theta = \theta_R = \arcsin\frac{n_o}{n_e}$$

will experience the index $n_e$ and will be totally transmitted, whereas the orthogonal polarization will experience $n_o$ and thus be under conditions for total reflection: it is therefore totally reflected.

Let P be the polarization in the plane of incidence (the plane of the drawing in FIG. 1).

Let S be the polarization perpendicular to the plane of incidence (perpendicular to the plane of the drawing). Thus:

P experiences the index $n_o$ and is totally reflected for $\theta > \theta_R$

S experiences the index $n_e$ and is totally transmitted.

The numerical example given in French Patent Application No. 2 685 500 corresponds to the case of a nematic liquid crystal with:

$n_o = 1.5$;

$n_e = 1.65$, the index of the 2 prisms;

$\theta_R = 65°$ (in the prism)

to stabilize the structure, the liquid crystal is polymerized.

The angles for which polarization splitting takes place are between 62° and 85° (the angles from 85° to 90° are not counted as they are difficult to use), i.e. ±12° in a medium of 1.7 index, corresponding to ±20° in air. It may be seen that the angular acceptance of this component is better than that of a Brewster interference splitter. The total reflection is also independent of the wavelength λ, provided that the indices $n_e$ and $n_o$ of the layer vary little with λ.

SUMMARY OF THE INVENTION

The invention relates to a device in which the birefringent layer is of a different nature.

The invention therefore relates to a polarization splitter comprising a splitting medium lying between two transparent elements of defined indices, characterized in that the splitting medium comprises a periodic structure of layers of materials of different indices and of a period which is small compared with the wavelength of an incident beam. This stack forms, by "form birefringence", a uniaxial birefringent medium of optical axis perpendicular to the plane of the periodic structure.

BRIEF DESCRIPTION OF THE DRAWINGS

The various objects and characteristics of the invention will become more clearly apparent in the description which follows and in the appended figures which show:

FIGS. 4 and 5, curves of the ordinary and extraordinary indices.

DESCRIPTION OF THE PREFERRED EMBODIMENTS

An embodiment of a polarization splitter according to the invention will now be described.

Figure 1:
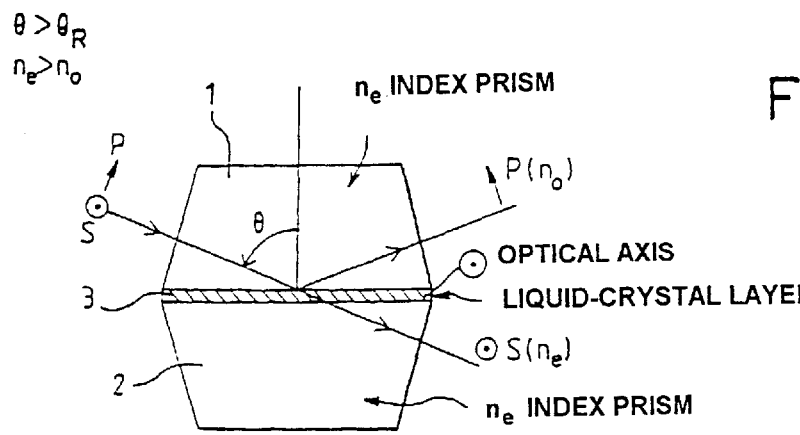
FIG. 1, an example of a splitter known in the art.
Figure 2:
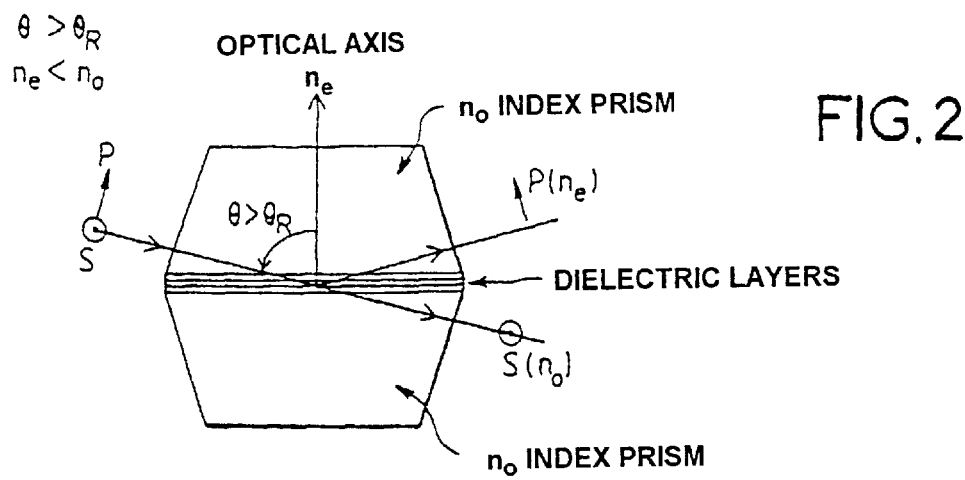
FIG. 2, an embodiment of a splitter according to the invention.

This splitter, like that shown in FIG. 2, has a periodic index structure 13 lying between two media 11 and 12 transparent at the wavelengths of the incident light beam to be treated.

The periodic structure is preferably an alternation of thin layers of two materials of different indices $n_1$ and $n_2$. It may also be a volume grating recorded in a holographic material. The period of the periodic structure is small compared with the wavelengths of the incident beam.

When the period of the periodic index structure is sufficiently small compared with the wavelength of the incident light, the latter does not resolve the index modulation of the structure and sees an "artificial" uniaxial birefringent medium, the optical axis of which is normal to the plane of the layers of the same index.

For a stack of thin layers of indices $n_1$, $n_2$ and thickness $d_1$, $d_2$, it may be demonstrated that the indices seen by light of wavelength $\lambda$ such that $\lambda >> d_1, d_2$ (typically $d_1, d_2, < \lambda/5$, or indeed $d_1, d_2 < \lambda/10$) are:

$$\frac{1}{n_e^2} = \frac{d_1}{d_1+d_2}\frac{1}{n_2^2} + \frac{d_2}{d_1+d_2}\frac{1}{n_1^2}$$

$$n_o^2 = \frac{d_1}{d_1+d_2}n_1^2 + \frac{d_2}{d_1+d_2}n_2^2$$

Figure 3:
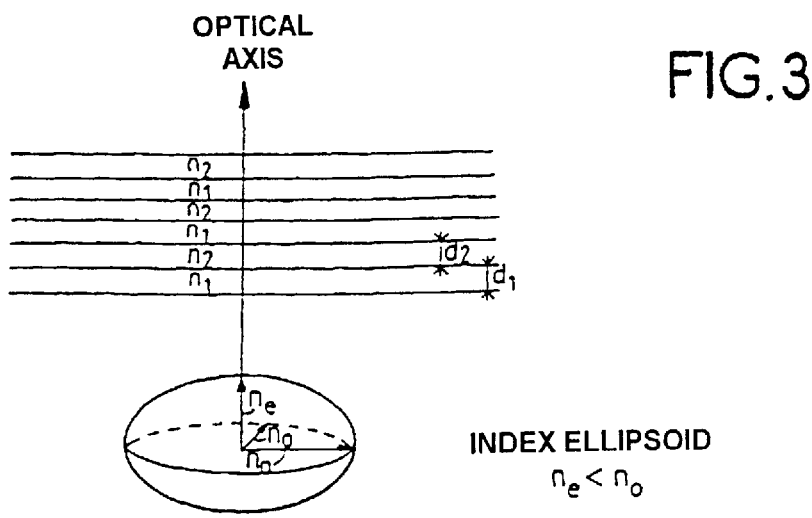
FIG. 3, a diagram explaining the structure of the splitter in FIG. 2.

The difference $n_e^2 - n_o^2$ is always negative, hence $n_e < n_o$. The dielectric multilayer is equivalent to a negative uniaxial crystal whose optical axis is perpendicular to the layers (cf. FIG. 2). The invention therefore consists in producing a polarization splitter using the principle of total reflection on a birefringent layer made from a stack of dielectric layers operating in "form birefringence". The splitter according to the invention is described in FIG. 3. The index of the prisms must be equal to the high index of the birefringent medium, i.e. $n_o$.

Given the configuration of the index ellipsoid, the incident polarization P sees an index $n_e$ lower than the index $n_o$, equal to that of the prism, and is therefore reflected for $\theta > \theta_R$. The incident polarization S sees an index $n_o$ equal to the prism, and is therefore totally transmitted.

Two practical embodiments of the invention will now be described.

According to a first embodiment, the birefringent medium is made of a stack of MgF$_2$ and TiO$_2$ layers with:

MgF$_2$: index $n_1 = 1.38$, thickness $d_1$;
TiO$_2$: index $n_2 = 2.4$, thickness $d_2$.

Figure 4:
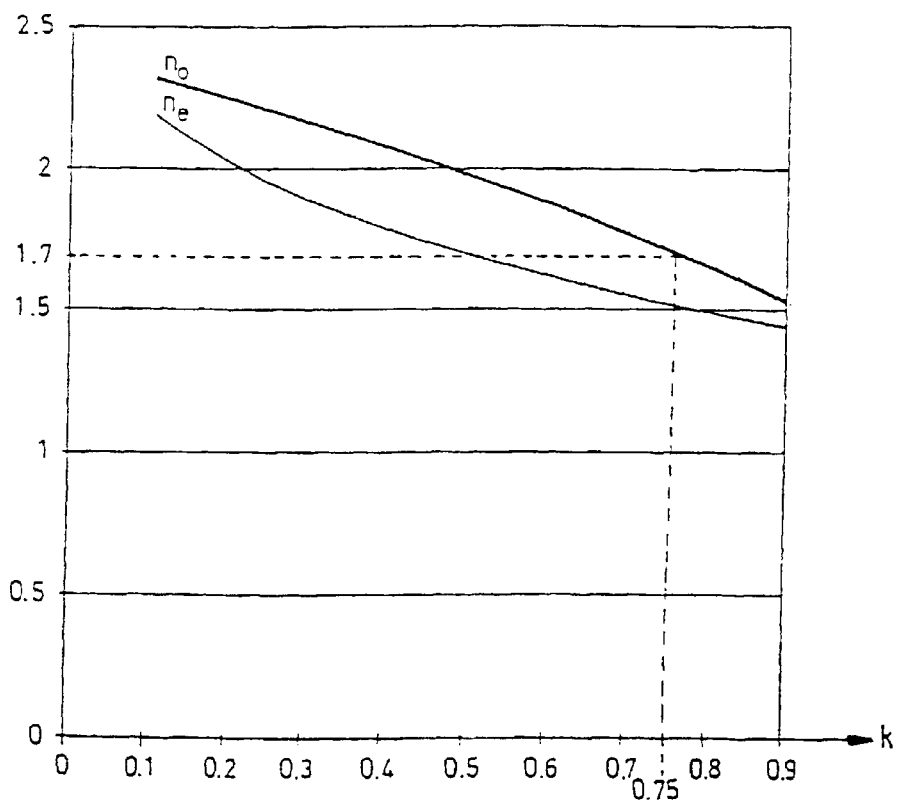

The curve in FIG. 4 shows how $n_e$ and $n_o$ vary as a function of the proportion k of MgF$_2$ in the thickness of the stack:

$$k = \frac{d_1}{d_1+d_2}$$

It may be seen that for $k=0.75$, $n_o=1.7$ and $n_e=1.5$. It is possible to use prisms of 1.7 index. The angle $\theta_R$ for the 1.7–1.5 index difference is equal to 62°.

The thickness of the dielectric layers $d_1$ and $d_2$, in order to be under "form birefringence" conditions for the entire visible spectrum, is approximately such that $d_1+d_2 \leq 100$ nm, for example $d_1=75$ nm and $d_2=25$ nm.

It may be demonstrated that for the case in question, the total thickness of the multilayer must be at least equal to $\lambda$ in order to have unfrustrated total reflection. The thickness of 7 pairs of MgF$_2$/TiO$_2$ layers such that $d_1+d_2=100$ nm satisfies this condition over the entire visible spectrum ($\lambda \in [0.4\ \mu m–0.65\ \mu m]$).

According to a second embodiment, the birefringent medium consists of a stack of silicon layers and MgF$_2$ layers.

The angular bandwidth of the component is proportional to the difference between the ordinary index and the extraordinary index, which itself strongly correlates with the difference between the indices of the two materials making up the dielectric stack. Materials having a very high index, such as silicon (n=3.8), may be used despite the fact that they are not transparent in the visible (imaginary part of the index of 0.1 in the blue and of 0.01 in the red). This is because its high index makes it possible to produce stacks in which it is present only in a very small proportion, approximately 10% (cf. FIG. 5), and its absorption is therefore negligible. FIG. 5 shows that the difference between the ordinary and the extraordinary indices obtained with 10% silicon is 0.35.

It would also be possible to use other semiconductors, such as GaAs and C (diamond).

According to the invention, the splitting medium is preferably a stack of layers of high and low indices and, in particular, the layers of high index may be a semiconductor material. In addition, the media on each side of the splitting medium are of defined indices. The splitter operates in non-guided optics and has a high angular acceptance.

What is claimed is:

1. A polarization splitter, comprising a splitting medium lying between two transparent elements of defined indices, characterized in that the splitting medium comprises a periodic structure of layers of materials of different indices, having high and low indices, and having a period which is small compared with the wavelength of an incident beam, forming a uniaxial birefringent medium of optical axis perpendicular to the plane of the periodic structure, the two transparent elements being made of a material of index approximately equal to the ordinary index ($n_o$) of the periodic structure.

2. The polarization splitter as claimed in claim 1, characterized in that the high-index layers are made of a semiconductor material.

3. The polarization splitter as claimed in claim 1, characterized in that the periodic structure comprises an alternation of layers.

4. The polarization splitter as claimed in claim 1, characterized in that the periodic structure is a volume holographic grating.

5. The splitter as claimed claim 2, characterized in that the thickness of the periodic structure is at least equal to the wavelength of the incident beam.

6. The splitter as claimed in claim 2, characterized in that it operates in non-guided optics.

7. The splitter as claimed in claim 3, characterized in that the thickness of the periodic structure is at least equal to the wavelength of the incident beam.

* * * * *